US007917111B2

(12) United States Patent
Szczublewski et al.

(10) Patent No.: US 7,917,111 B2
(45) Date of Patent: Mar. 29, 2011

(54) METHOD AND SYSTEM FOR MONITORING BROADCAST AUDIO PROGRAMS FROM THE BEGINNING OF THE PROGRAMS

(75) Inventors: Francis E. Szczublewski, Macomb, MI (US); Laci J. Jalics, Ray, MI (US)

(73) Assignee: Delphi Technologies, Inc., Troy, MI (US)

( * ) Notice: Subject to any disclaimer, the term of this patent is extended or adjusted under 35 U.S.C. 154(b) by 1208 days.

(21) Appl. No.: 11/544,440

(22) Filed: Oct. 4, 2006

(65) Prior Publication Data

US 2008/0086753 A1 Apr. 10, 2008

(51) Int. Cl.
*H04B 1/18* (2006.01)
*H04H 20/74* (2008.01)

(52) U.S. Cl. ............... 455/179.1; 455/185.1; 455/186.1; 455/3.02; 369/7

(58) Field of Classification Search ................. 455/3.01, 455/3.02, 3.04, 179.1, 185.1, 186.1; 369/7
See application file for complete search history.

(56) References Cited

U.S. PATENT DOCUMENTS

| | | | | |
|---|---|---|---|---|
| 4,268,724 | A * | 5/1981 | Hubbard | 369/7 |
| 5,371,551 | A * | 12/1994 | Logan et al. | 348/571 |
| 5,524,051 | A * | 6/1996 | Ryan | 380/237 |
| 6,173,112 | B1 * | 1/2001 | Gruse et al. | 386/83 |
| 6,363,440 | B1 * | 3/2002 | Stepp et al. | 710/52 |
| 6,956,795 | B2 * | 10/2005 | Schwartz | 369/7 |
| 7,343,141 | B2 * | 3/2008 | Ellis et al. | 455/132 |
| 7,565,104 | B1 * | 7/2009 | Brown et al. | 455/3.01 |
| 2003/0163823 | A1 * | 8/2003 | Logan et al. | 725/89 |
| 2003/0206499 | A1 * | 11/2003 | Schwartz | 369/7 |
| 2003/0227830 | A1 * | 12/2003 | Lauke | 369/7 |
| 2004/0032805 | A1 * | 2/2004 | Schade-Buensow et al. | 369/47.33 |

* cited by examiner

*Primary Examiner* — Duc M Nguyen
(74) *Attorney, Agent, or Firm* — Jimmy L. Funke

(57) ABSTRACT

A method and system for monitoring broadcast programs from the beginning of the programs is provided. The system includes a tuner configured to receive and decode broadcast signals and provide programming as an output. The system also includes a buffer coupled to the tuner that stores programming from the tuner and provides buffered programming as an output delayed in time from the programming provided by the tuner. The system further includes processing circuitry coupled to the tuner and buffer that determines if the tuner is selected as a source for programming, and if a program is in progress when the tuner is selected. The processing circuitry provides the tuner programming as an output of the system if a program is not in progress when the tuner is selected, and provides the buffered programming as an output of the system if a program is in progress when the tuner is selected.

16 Claims, 3 Drawing Sheets

METHOD AND SYSTEM FOR MONITORING BROADCAST AUDIO PROGRAMS FROM THE BEGINNING OF THE PROGRAMS

TECHNICAL FIELD

The present invention relates generally to broadcast audio receiving and processing systems and methods, and, more specifically, to the receiving, tuning, buffering and playback of radio broadcast programs in vehicle receiver systems.

BACKGROUND OF THE INVENTION

Trucks, boats, automobiles and other vehicles are commonly equipped with various signal communication devices such as radios for receiving broadcast radio frequency (RF) signals, processing the RF signals, and broadcasting audio information to passengers. Satellite digital audio radio (SDAR) services have become increasingly popular, offering digital radio service covering large geographic areas, such as North America. Other geographic areas, such as Europe, are also beginning to offer SDAR services. These services typically receive uplinked programming which, in turn, is provided to subscriber RF receivers via satellites or terrestrial receivers. Each subscriber to the service generally possesses a digital radio having an RF receiver and one or more antennas for receiving the digital broadcast.

In satellite digital audio radio services systems, the radio RF receivers are generally configured to tune to certain frequencies, receive digital data signals at those frequencies, and decode the digital data signals, which typically include digital audio programming, such as, for example, songs. In addition to broadcasting the encoded digital quality audio signals, the satellite service may also transmit data that may be used for various other applications. The broadcast signals may include advertising, information about warranty issues, information about the broadcast audio programs, and news, sports, and entertainment programming. Thus, the digital broadcasts may be employed for any of a number of satellite audio radio, satellite television, satellite Internet, and various other consumer services.

In typical RF receivers receiving analog RF signals, such as, for example, FM radio signals, the RF receiver has one FM tuner that is configured to tune in various FM radio stations located at different FM frequencies, based on user input. In operation, a user of a typical FM receiver will use a dial or other input means to select a certain frequency for the FM tuner, and will then hear audio programming, such as songs, being broadcast at the selected FM frequency. If the user desires to change frequencies to see what may be playing on another channel (i.e. FM frequency), the user will typically use the dial or other input means to change the frequency. Once a new frequency has been selected in the tuner, the user will be able to hear audio programming being broadcast on the new selected frequency. Because the timing of the changing of frequencies by a user is unpredictable, and is not synchronized to the broadcast of audio content on any given frequency, a user may encounter audio programming at various stages of playback when a new frequency is tuned in. For example, when a user tunes to a new frequency, the user may encounter a song that has just started, is in the middle of the song, or is nearing the end of the song. Alternatively, the user might encounter commercials or other broadcast audio.

Increasingly, RF receivers may include multiple tuners. These tuners may be preset to certain frequencies, or may be selectable or reconfigurable by the user to tune to various frequencies. In a multi-tuner scenario, in addition to having the option of changing the frequency of a given tuner in order to select programming that may be available at another frequency, a user may also have the option of simply selecting a different tuner that is already set to another frequency, thereby using that different tuner as the source for audio programming. Using multiple tuners may provide certain advantages to users, such as, for example, decreasing the amount of time required to hear content broadcast on a different frequency. However, even though multiple tuners may provide advantages over single tuner receivers, the problem discussed above with respect to the asynchronous nature of broadcast audio programming and user-initiated frequency changes remains. In other words, users changing frequencies by selecting a different tuner may still encounter a song that has already started when switching tuners. This can be frustrating to users, particularly if the song encountered in-progress is a song that the user would like to have heard in its entirety.

What is needed is a system and method that enables audio receiver users encountering a song or audio program already in progress when changing audio channels and/or frequencies, to hear the entire song and/or audio program from its beginning.

SUMMARY OF THE INVENTION

In accordance with one aspect of the present invention, a system for monitoring broadcast programs from the beginning of the programs is provided. The system includes a tuner configured to receive and decode broadcast signals to provide programming that includes programs as an output. The system also includes a buffer coupled to the tuner. The buffer is configured to receive and store programming from the tuner, and provide buffered programming as an output that is delayed in time from the programming output by the tuner. The system also includes processing circuitry coupled to both the tuner and the buffer. The processing circuitry is configured to determine if the tuner is selected as a source for programming, and if a program is in progress when the tuner is selected as a source. The processing circuitry is also configured to provide the programming provided by the tuner as an output if a program is not in progress when the tuner is selected, and to provide the buffered programming as an output if a program is in progress when the tuner is selected.

In accordance with another aspect of the present invention, a system for monitoring broadcast programs from the beginning of the programs is provided. The system includes a tuner configured to receive and decode broadcast signals to provide programming that includes programs as an output. The system also includes a buffer coupled to the tuner. The buffer is configured to receive and store programming from the tuner, and provide buffered programming as an output that is delayed in time from the programming output by the tuner. The system also includes processing circuitry coupled to both the tuner and buffer. The processing circuitry is configured to determine if the tuner is selected as a source for programming, and if a program is in progress when the tuner is selected as a source. The processing circuitry is also configured to identify in the buffered programming the beginning of a program provided by the tuner that is in progress when the tuner is selected as a source. The system also includes user input circuitry coupled to the processing circuitry. The user input circuitry is configured to select between programming provided by the tuner and buffered programming provided by the buffer as an output of the system.

In accordance with yet another aspect of the present invention, a method for monitoring broadcast programs from the beginning of the programs is provided. The method includes the steps of receiving broadcast programming including programs in a tuner and storing the received programming in a buffer as buffered programming. The method further includes the steps of selecting the tuner as a source for programming and determining if a program is in progress in the programming received in the tuner. The method still further includes the steps of providing programming from the tuner as an output of the receiver if a program is not in progress, and providing buffered programming as an output of the system if a program is in progress.

In accordance with still another aspect of the present invention, a method for monitoring broadcast programs from the beginning of the programs is provided. The method includes the steps of receiving broadcast programming including programs in a tuner of a receiver and storing the received programming in a buffer as buffered programming. The method also includes the steps of selecting the tuner as a source for programming to be provided as an output, and providing programming from the tuner as an output of the receiver. The method still further includes the step of providing buffered programming from the buffer as an output of the receiver if a user selects the buffer as a source for programming.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figures 1A, 1B, 1C:
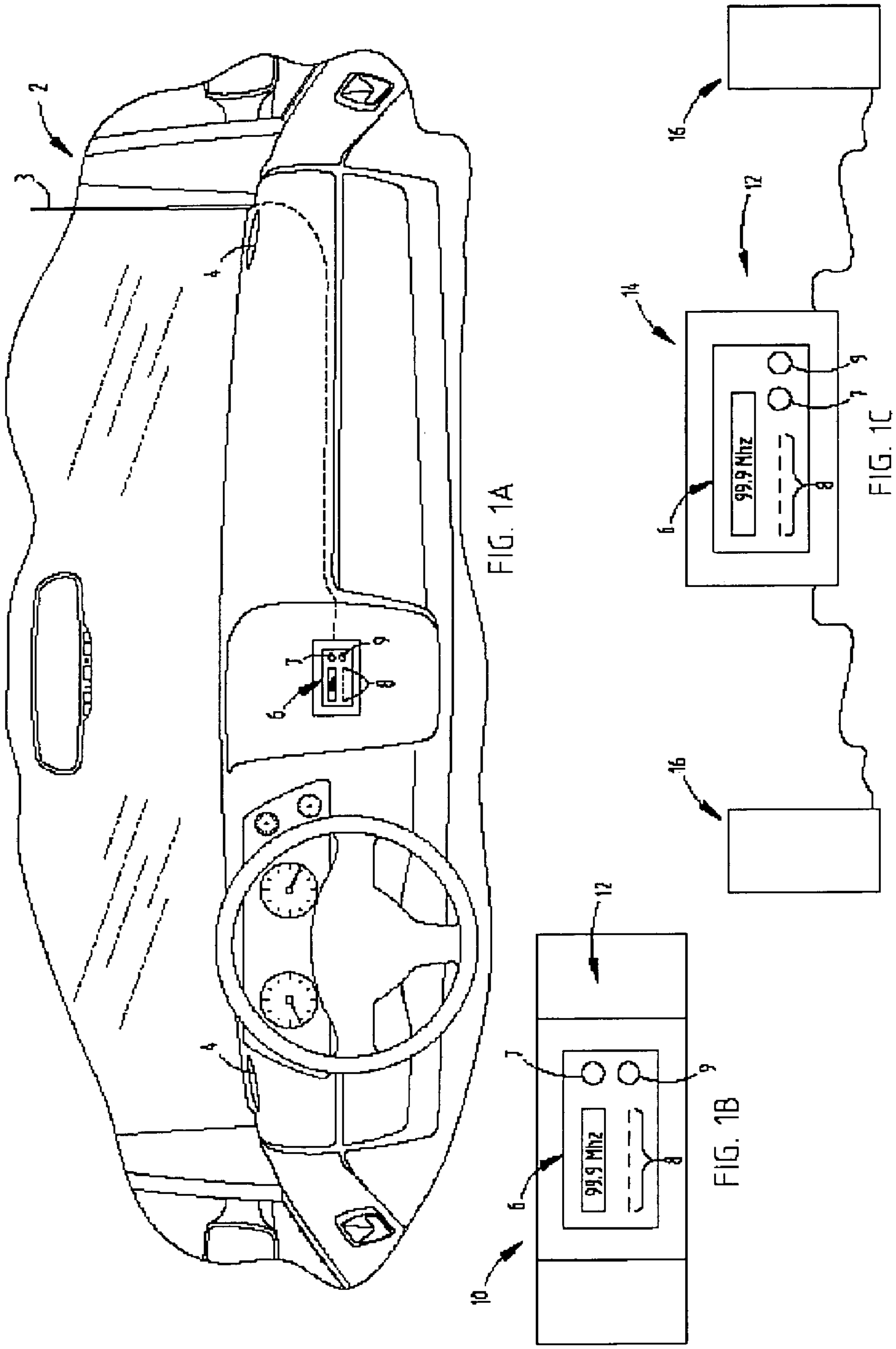
FIG. 1A is a general schematic diagram generally illustrating a vehicle receiver system employed in the cockpit of a vehicle, according to one embodiment of the present invention.
FIG. 1B is a general schematic diagram generally illustrating a portable receiver system, according to one embodiment of the present invention.
FIG. 1C is a general schematic diagram generally illustrating a home receiver system, according to one embodiment of the present invention.

Referring now to FIG. 1A, a vehicle audio system 2 is generally illustrated including a receiver 6 configured to monitor broadcast programs from the beginning of the programs, according to one embodiment of the present invention. The vehicle audio system 2 includes an antenna 3 and speakers 4 coupled to the receiver 6. Receiver 6 is configured to receive and decode audio signals received via antenna 3, and provide the decoded audio signals including programming, such as music and other programs, through speakers 4. As shown, receiver 6 includes a volume control 7 and tuner control 9 configured to allow users of the receiver 6 to control the volume of programs provided through speakers 4, and to control the stations, channels, and/or frequencies on which receiver 6 receives audio signals. Receiver 6 also includes preset user input 8 configured to allow users of receiver 6 to select predetermined frequencies (i.e., channels), such that receiver 6 receives audio programs on those predetermined frequencies when an individual preset user input 8 is selected by the user.

FIG. 1B generally illustrates a portable audio system 10 including a receiver 6 configured to monitor broadcast programs from the beginning of the programs, according to another embodiment. Receiver 6 is coupled to speakers 12, and includes volume control 7, tuner control 9, and preset user input 8, and operates in a manner similar to the receiver 6 generally described in FIG. 1A.

FIG. 1C generally illustrates a home audio system 14 configured to monitor broadcast programs from the beginning of the programs, according to a further embodiment. As shown, home audio system 14 is coupled to speakers 16, and includes a receiver 6 including tuner control 9, volume control 7, and preset user input 8. The receiver 6 operates in a manner similar to the receiver 6 of FIGS. 1A and 1B.

Figure 2:
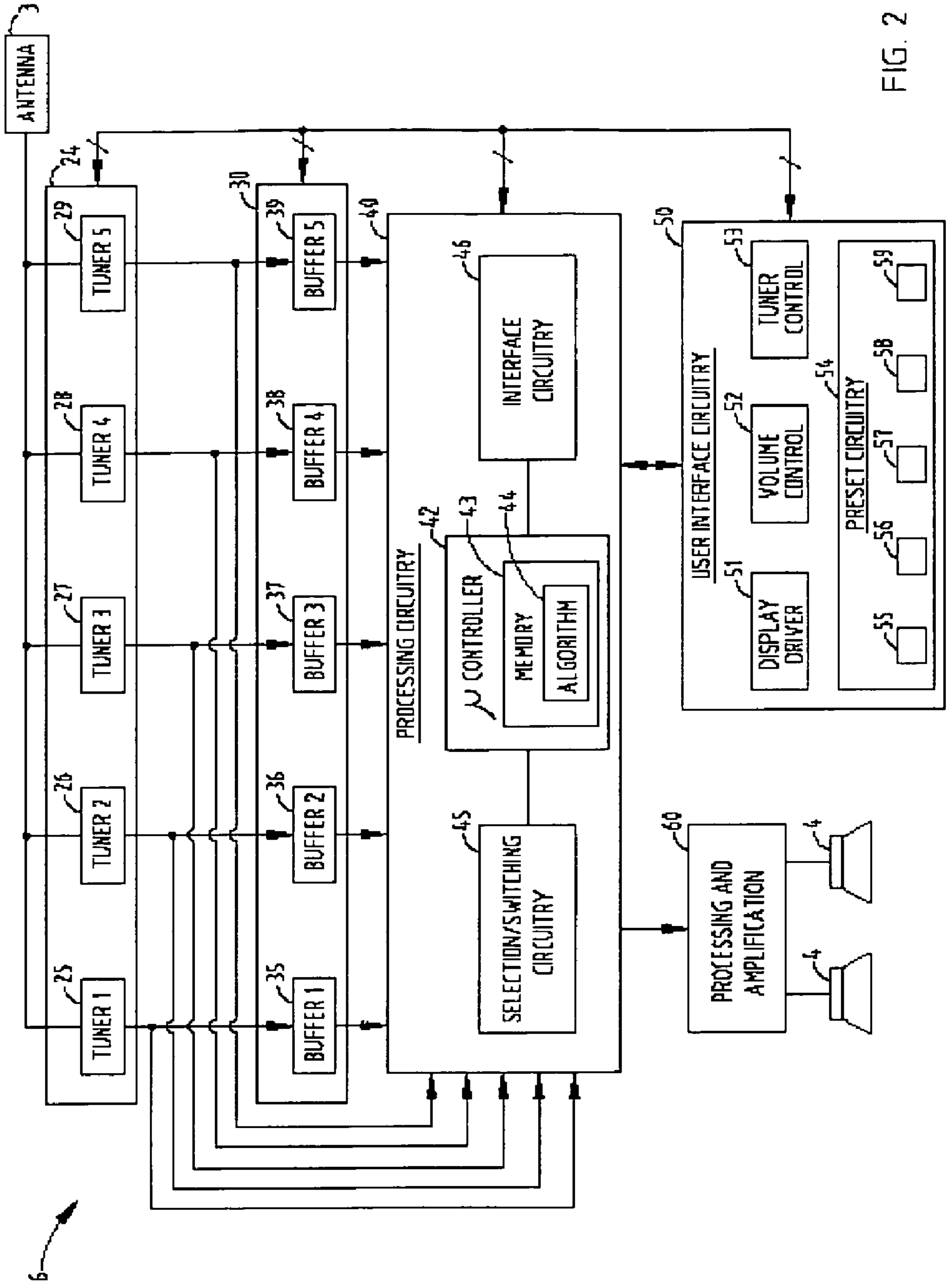
FIG. 2 is a block diagram generally illustrating a receiver system, according to one embodiment of the present invention.

FIG. 2 provides additional detail of one embodiment of a receiver 6 of the embodiment of FIG. 1A. As shown, receiver 6 is configured to monitor broadcast programs from the beginning of the programs. In the present embodiment, receiver 6 is a satellite digital audio radio (SDAR) receiver configured to receive XM® radio signals. In an alternate embodiment, receiver 6 is an SDAR receiver configured to receive SIRIUS™ radio signals. In yet another alternate embodiment, receiver 6 is a receiver configured to receive radio signals other than SIRIUS™ or XM® radio signals, such as, for example, HD radio signals, in-band on-channel radio signals, and other broadcast radio signals. As shown, receiver 6 includes an antenna 3 coupled to a tuner section 24. In the present embodiment, tuner section 24 includes multiple tuners 25-29, each of which is configured to receive SDAR signals. In alternate embodiments in which receiver 6 is configured to receive signals other than SIRIUS™ or XM® radio signals, tuners 25-29 of tuner section 24 are configured to receive and process radio signals other than SIRIUS™ or XM® radio signals, such as, for example, HD radio signals, in-band on-channel radio signals, and other broadcast radio signals. In yet another alternate embodiment, multiple antennas may be coupled to tuner section 24. In the present embodiment, each of tuners 25-29 may be tuned to a different frequency and/or channel for receiving audio content. Each of tuners 25-29 is configured to receive SDAR signals at the frequency to which the tuners 25-29 are tuned, and process the received SDAR signal to extract audio programming. In the present embodiment, the audio programming provided by each of the tuners 25-29, after the received SDAR signals have been received and decoded, is provided as an output stream of audio programming. It should be appreciated that the stream of audio programming provided by each of tuners 25-29 includes various programs, such as, for example, songs and/or other audio content.

As shown in FIG. 2, tuner section 24 is electrically coupled to a memory buffer section 30. In the present embodiment, buffer section 30 includes multiple buffers 35-39. As shown, each tuner 25-29 of tuner section 24 is electrically coupled to a corresponding buffer 35-39 associated with that tuner. For example, the output of tuner 25 of tuner section 24 is electrically coupled to the input of buffer 35 of buffer section 30, the output of tuner 26 of tuner section 24 is electrically coupled to the input of buffer 36 of buffer section 30, and so on. In this manner, the audio programming output by each of tuners 25-29 of tuner section 24 is provided to the buffers 35-39. Each of buffers 35-39 is configured to store a predetermined amount of the audio programming provided to it by the tuners 25-29. In the present embodiment, each of buffers 35-39 are configured to store approximately five minutes of audio programming. In alternate embodiments, buffers 35-39 are configured to store other durations of audio programming, such as, for example, more than five minutes of audio programming, or less than five minutes of audio programming. It should be appreciated that the sizes of the buffers 35-39 can be increased, such that the buffers 35-39 can store hours of audio programming or more.

Buffer section 30 is also shown being electrically coupled to processing circuitry 40, such that the content of buffers 35-39 is provided to processing circuitry 40. More specifically, in the present embodiment, each of buffers 35-39 is electrically coupled to processing circuitry 40, such that the audio programming stored in each of buffers 35-39 is provided to processing circuitry 40.

As is also shown in FIG. 2, tuner section 24 is electrically coupled to processing circuitry 40. More specifically, each of tuners 25-29 is electrically coupled to processing circuitry 40, such that the audio programming provided as an output of each of tuners 25-29 is provided as an input to processing circuitry 40. In the present embodiment, the audio programming provided as an output by tuners 25-29 to buffers 35-39 and processing circuitry 40 is in a digital form. As shown, processing circuitry 40 includes a microcontroller 42 including memory 43 containing an algorithm 44. Processing circuitry 40 also includes interface circuitry 46 and selection/switching circuitry 45. Processing circuitry 40 is also shown electrically coupled to post-processing and amplification circuitry 60 and user interface circuitry 50. Processing circuitry 40 is configured to process the audio programming received from tuners 25-29 of tuner section 24 and buffers 35-39 of buffer section 30 to determine which audio programming is to be provided as an output to post-processing and amplification circuitry 60. Processing circuitry 40 determines which audio programming to provide as an output based, at least in part, on information provided to processing circuitry 40 by user interface circuitry 50. User interface circuitry 50, in addition to being electrically coupled to processing circuitry 40, is also electrically coupled to post-processing and amplification circuitry 60.

As shown, user interface circuitry 50 includes volume control circuitry 52, tuner control circuitry 53, display driver circuitry 51, and preset circuitry 54, including preset user inputs 55-59. User interface circuitry 50 is configured to receive user inputs via volume control circuitry 52, tuner control circuitry 53, and preset circuitry 54, and utilize those inputs to provide signals to processing circuitry 40 and post-processing and amplification circuitry 60 to control the signals provided by processing circuitry 40 to post-processing and amplification circuitry 60, and to control the volume of audio programming provided by post-processing and amplification circuitry 60 to speakers 4. User interface circuitry 50 is also shown electrically coupled to buffer section 30 and tuner section 24.

In operation, a user of receiver 6 utilizes preset circuitry 54 and/or tuner control 53 to determine individual preset frequencies for each of tuners 25-29 of tuner section 24. At the end of the selection process, which may be accomplished by a variety of methods that are generally known, each of tuners 25-29 will be tuned to an individual preset frequency, such that each of tuners 25-29 receives SDAR signals at those preset frequencies, and decodes the received SDAR signals to provide, as an output, audio programming received via the SDAR signals at the predetermined frequencies.

Receiver 6 is configured such that the decoded audio programming provided as an output of each of tuners 25-29 is continuously provided as an input to each of the buffers 35-39 corresponding to each of the tuners 25-29. In addition, the decoded audio programming provided by each of tuners 25-29 is provided as an input to processing circuitry 40. Receiver 6 is configured such that when a specific preset user input 55-59 is selected by a user of receiver 6, that selection is provided to processing circuitry 40. Receiver 6 is also configured such that when a user selects a frequency using tuner control circuitry 53, the selected frequency is provided to processing circuitry 40.

Algorithm 44 stored as code in memory 43 of microcontroller 42 is executed by a processor such that it operates to analyze the audio programming provided by the frequency/tuner selected by the user of receiver 6. In the present embodiment, this selection is made using either specific preset user inputs 55-59, or tuner control circuitry 53. Processing circuitry 40 first determines if the selected frequency/tuner is having its audio programming captured by a buffer. If not, processing circuitry 40 operates to provide the audio programming provided as an output of the selected frequency/tuner to post-processing and amplification circuitry 60, where the audio programming is processed and amplified and provided to speakers 4. If so, processing circuitry 40 analyzes the audio programming to determine if a song is already in progress on the selected tuner. If a song is not already in progress, processing circuitry 40 operates to provide the audio programming provided as an output of the selected tuner to post-processing and amplification circuitry 60, where the audio programming is processed and amplified and provided to speakers 4. If, however, processing circuitry 40 determines that a song is already in progress when a specific frequency/tuner is selected by a user of receiver 6, processing circuitry 40 selects the buffered audio stored in the buffer associated with the selected frequency/tuner, evaluates the buffered audio to identify the location in the buffered audio programming of the beginning of the song that was in process when the specific frequency/tuner was selected, and provides the buffered audio programming to post-processing and amplification circuitry 60, starting at the beginning of the song.

Post-processing and amplification circuitry 60 processes and amplifies the buffered audio programming, and provides it as an output to speakers 4. Processing circuitry 40 continues to provide the buffered audio programming, rather than the audio programming provided by the tuner tuned to the selected frequency, to post-processing and amplification circuitry 60, until post-processing and amplification circuitry 40 determines that a different frequency has been selected by a user of receiver 6, or until the system is powered off. In this manner, when a user selects a frequency or channel that is already playing a song, the user will be able to hear the song from the beginning, because the audio is provided from the buffer associated with a tuner tuned to the selected frequency, rather than from the tuner itself.

Because the buffers 35-39 are configured to continuously provide a delayed version of the audio programming provided by the tuner with which a given buffer is associated, it should be appreciated that when processing circuitry 40 selects a buffer 35-39 as a source for the playback of audio programming, playback can occur from the selected buffer indefinitely, with the audio programming provided by the selected buffer being delayed with respect to the real-time audio programming being provided by the associated tuner.

In an alternate embodiment, receiver 6 is configured such that when a user selects a specific tuner using the preset user inputs 55-59, processing circuitry 40 provides the audio programming output by the selected tuner to post-processing and amplification circuitry 60. Post-processing and amplification circuitry 60 then post-processes and amplifies the audio programming, and provides it to speakers 4, such that a user of receiver 6 can perceive the audio programming. Receiver 6 is further configured such that if a user hearing the post-processed and amplified audio programming determines that a program, such as, for example, a song, is in progress when the tuner is selected, the user may provide user input, such as, for example, by pushing the same preset user input a second time, to cause processing circuitry 40 to switch to using the buffer associated with a selected tuner as a source for audio programming to be provided to post-processing and amplification circuitry 60. In this alternate embodiment, when a user provides an indication that the user wishes playback to occur from the buffer, rather than from the selected tuner, processing circuitry 40 is configured to identify the beginning of the song that is in progress when the user first selected the selected tuner, and provide the buffered audio programming as an output to post-processing and amplification circuitry 60, starting at the beginning of the song. In this alternate embodiment, the user of receiver 6 is able to manually control whether playback occurs from the tuner or its associated buffer.

In the embodiments described above, processing circuitry 40 is configured to determine if a song is in progress, and/or to begin playback from a buffer at the beginning of a song that was in progress when a given frequency/tuner was selected. It should be appreciated that in alternate embodiments, receiver 6 can be configured to provide playback from a buffer at the beginning of a program other than a song, such as, for example, a news broadcast or other program. Although in the present embodiment, buffer section 30 includes several individual buffers 35-39, it should be appreciated that in an alternate embodiment, buffer section 30 could be a single buffer having different areas allocated to provide buffer space for various tuners of the receiver 6. Although tuner section 24 is shown having five individual tuners 25-29, it should be appreciated that in alternate embodiments, more or fewer tuners could be employed without departing from the invention.

Although processing circuitry 40 is shown including a microcontroller 42 having memory 43 and an algorithm 44, it should be appreciated that in alternate embodiments, processing circuitry 40 may include circuitry other than microcontroller 42, memory 43, and algorithm 44 configured to perform the functions of processing circuitry 40 as described above.

In the present embodiment, the SDAR signals received and processed by tuner section 24 include program information about programs provided in the SDAR signals. More specifically, the SDAR signals include program information about songs provided by the SDAR signals, including the length of the songs, the current position within the songs of the songs transmitted using an SDAR signal, the name of the songs, and the genre of the songs. While processing circuitry 40 of the present embodiment utilizes this program information to identify a song being played by a given tuner, identify the location of the song in the buffer associated with the given tuner, and to identify the beginning location in the buffer of the song, in an alternate embodiment, processing circuitry 40 is configured to provide the functions described above without utilizing program information provided by SDARS signals received by tuners 25-29. Processing circuitry 40 accomplishes this by analyzing the signals provided to and/or from tuners 25-29 to identify the beginning location of songs.

In one alternate embodiment, receiver 6 is configured to receive RF AM/FM broadcast radio signals, and processing circuitry 40 is configured to analyze the AM/FM signals received by the tuner section 24, and/or audio signals output by tuner section 24, to determine the beginning location of songs or other broadcast programs. One skilled in the art will recognize that processing circuitry 40 can be configured to identify the beginning of programs and or songs by analyzing the received signals even if the received signals do not contain data about the programs being broadcast, such as, for example, program or song duration. Processing circuitry 40 can then use this information to determine if a song or program is in progress, and to begin playback from a buffer location at the beginning of a song or program that has been captured in a buffer if a song is in progress, or based on a user request.

Figure 3:
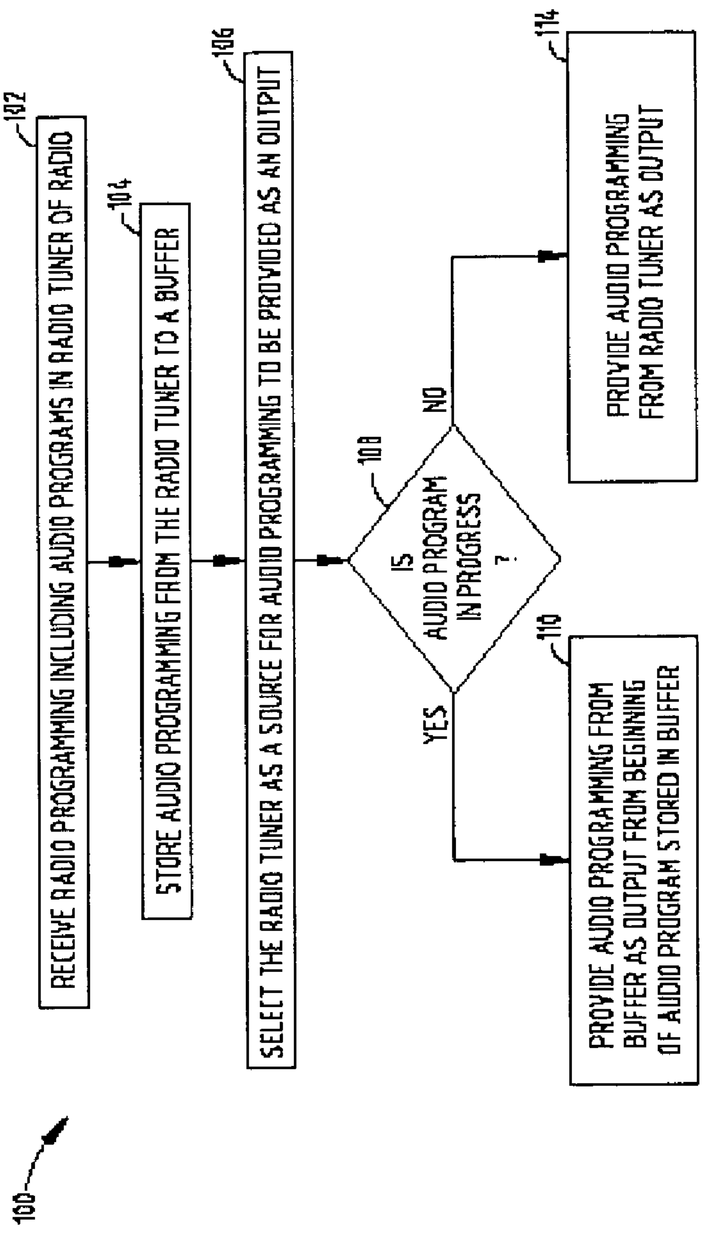
FIG. 3 is a flow diagram generally illustrating a method for monitoring broadcast audio programs from the beginning of the programs, according to one embodiment of the present invention.

FIG. 3 is a flowchart generally illustrating a method 100 for monitoring broadcast programs from the beginning of the programs, according to one embodiment of the present invention. In a first step 102 of the method 100, radio programming including audio programs is received and decoded by a tuner of a receiver. In a second step 104 of the method 100, the decoded audio programs from the tuner are stored in a buffer. In a third step 106 of the method 100, the tuner is selected as a source for audio programming to be provided as an output. In a fourth step 108 of the method 100, a determination is made as to whether or not an audio program of the radio programming provided by the tuner is in progress. If an audio program is in progress, audio programming is provided from the buffer as an output, in a step 110 of the method 100, starting from the beginning of the audio program that is in progress and stored in the buffer. If a program is not in progress, audio programming is provided from the tuner as an output in a step 114 of the method 100.

As described above, the invention advantageously provides for a method and system for allowing users to monitor audio programming from the beginning of the audio programming if the audio programming is already in process when a user switches to a new channel or frequency broadcasting the audio program.

The above description is considered that of the preferred embodiments only. Modifications of the invention will occur to those skilled in the art, and to those who make or use the invention. Therefore, it is understood that the embodiments shown in the drawings and described above are merely for illustrative purposes, and not intended to limit the scope of the invention, which is defined by the following claims, as interpreted according to the principles of patent law, including the doctrine of equivalents.

The invention claimed is:

1. A system for monitoring broadcast programs from the beginning of the programs, comprising:

a tuner configured to receive broadcast signals, decode the broadcast signals to provide programming including programs, and provide the programming as an output;

a buffer coupled to said tuner, said buffer being configured to receive programming from said tuner, store the programming in said buffer, and provide as an output buffered programming that is delayed in time from the original programming provided as an output by said tuner; and processing circuitry coupled to said tuner and said buffer, wherein said processing circuitry is configured to determine if said tuner is selected as a source for programming, and wherein said processing circuitry is further configured to determine if a program of the programming provided by said tuner is in progress when said tuner is selected as a source for programming, and wherein said processing circuitry is still further configured to provide the programming provided by said tuner as an output of the system if a program is not in progress, and wherein said processing circuitry is further configured to provide the buffered programming provided by said buffer as an output of the system if a program is in progress.

2. The system of claim 1, wherein said processing circuitry is further configured to identify in the buffered programming the beginning of a program provided by said tuner that is in progress when said tuner is selected as a source, and wherein the buffered programming provided by said buffer is provided as an output starting at the beginning of the program that is in progress when said tuner is selected as a source.

3. The system of claim 2, wherein said tuner is a digital satellite radio tuner configured to receive audio broadcast signals and convert the audio broadcast signals to audio programming.

4. The system of claim 3, wherein the programs are songs.

5. The system of claim 2, wherein said tuner is configured to receive satellite digital audio radio signals transmitted by a satellite digital audio radio system.

6. The system of claim 2, wherein the broadcast signals include program information including at least one of the length of programs being broadcast and the current position within a program of programs being broadcast.

7. The system of claim 6, wherein said processing circuitry is further configured to utilize the program information to determine if a program is in progress.

8. The system of claim 6, wherein said processing circuitry is further configured to utilize the program information to determine the location in said buffer of the beginning of the program to be provided as an output from said buffer.

9. The system of claim 6, wherein the programming stored in said buffer is removed from said buffer when the processing circuitry determines that the tuner is no longer selected as a source for programming.

10. The system of claim 1, further comprising:

a second tuner configured to receive broadcast signals, decode the broadcast signals to provide programming including programs, and provide the programming as an output;

a buffer coupled to said second tuner, said buffer being configured to receive programming from said second tuner, store the programming in said buffer, and provide as an output buffered programming that is delayed in time from the original programming provided as an output by said second tuner, wherein said processing circuitry is further coupled to said second tuner and said buffer, and wherein said processing circuitry is further configured to determine if said second tuner is selected as a source for programming, and wherein said processing circuitry is further configured to determine if a program of the programming provided by said second tuner is in progress when said second tuner is selected as a source for programming, and wherein said processing circuitry is still further configured to provide the programming provided by said second tuner as an output of the system if a program is not in progress, and wherein said processing circuitry is further configured to provide the buffered programming provided by said buffer as an output of the system if a program is in progress.

11. The system of claim 1, further comprising a vehicle antenna coupled to said tuner, wherein said vehicle antenna is configured to receive broadcast signals.

12. A method for monitoring broadcast programs from the beginning of the programs, comprising the steps of:

receiving broadcast programming including programs in a tuner of a receiver;

storing the received programming in a buffer as buffered programming;

selecting the tuner as a source for programming to be provided as an output of the receiver;

determining if a program is in progress in the programming received in the tuner;

providing programming from the tuner as an output of the receiver if a program is not in progress in the programming received in the tuner; and providing buffered programming from the buffer as an output of the receiver if a program is in progress in the programming received in the tuner, wherein the buffered programming is provided from the beginning of the program that is in progress when the tuner is selected as a source for programming to be provided as an output of the receiver.

13. The method of claim 12 wherein the received broadcast programming is digital radio program, and wherein the programs are songs.

14. The method of claim 12 wherein the received broadcast signals are signals transmitted by a satellite digital audio radio system.

15. The method of claim 12 wherein the received broadcast programming includes program information including at least one of the length of programs being broadcast and the current position within programs being broadcast.

16. The method of claim 12 further including the step of utilizing the program information to determine the location in the buffer of the beginning of the program to be provided as an output from the buffer.

* * * * *